April 2, 1935.   O. H. BLISS   1,996,668
VENDING MACHINE
Filed Oct. 24, 1933    6 Sheets-Sheet 1

O. H. Bliss INVENTOR
BY Victor J. Evans & Co.
ATTORNEY

April 2, 1935.  O. H. BLISS  1,996,668
VENDING MACHINE
Filed Oct. 24, 1933  6 Sheets-Sheet 2

O. H. Bliss
INVENTOR
BY Victor J. Evans & Co.
ATTORNEY

April 2, 1935.  O. H. BLISS  1,996,668
VENDING MACHINE
Filed Oct. 24, 1933  6 Sheets-Sheet 3
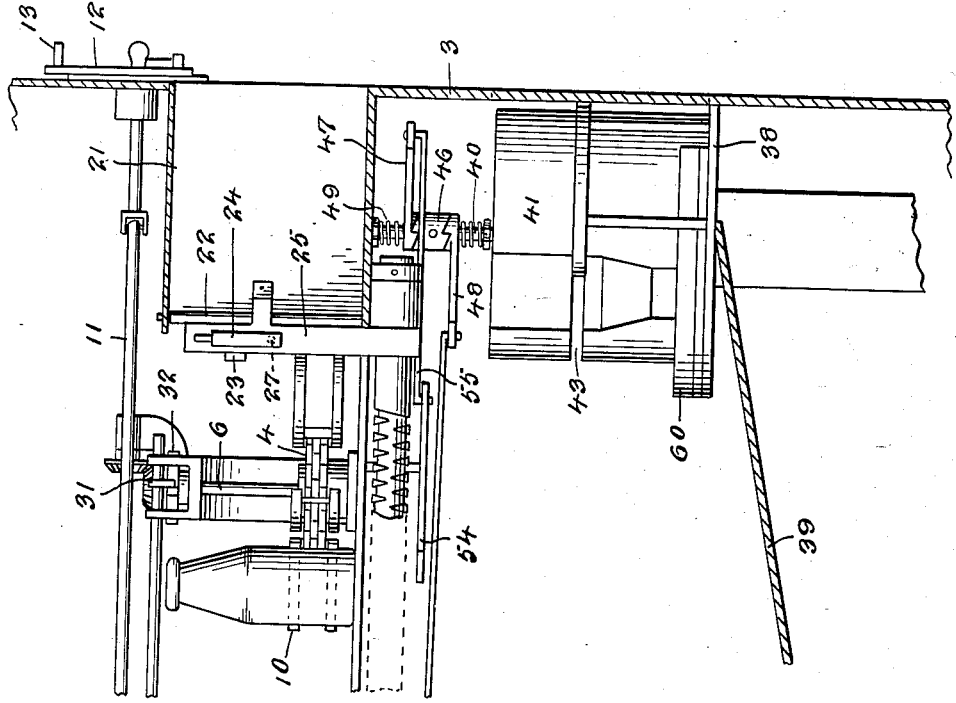
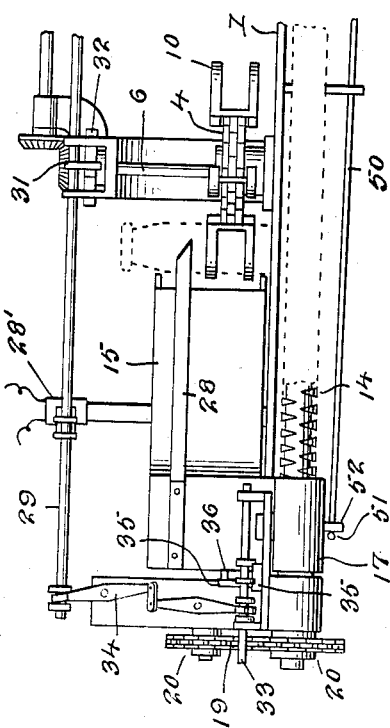
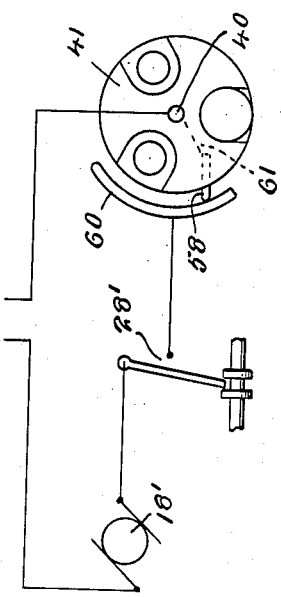
O. H. Bliss
INVENTOR
BY Victor J. Evans & Co.
ATTORNEY

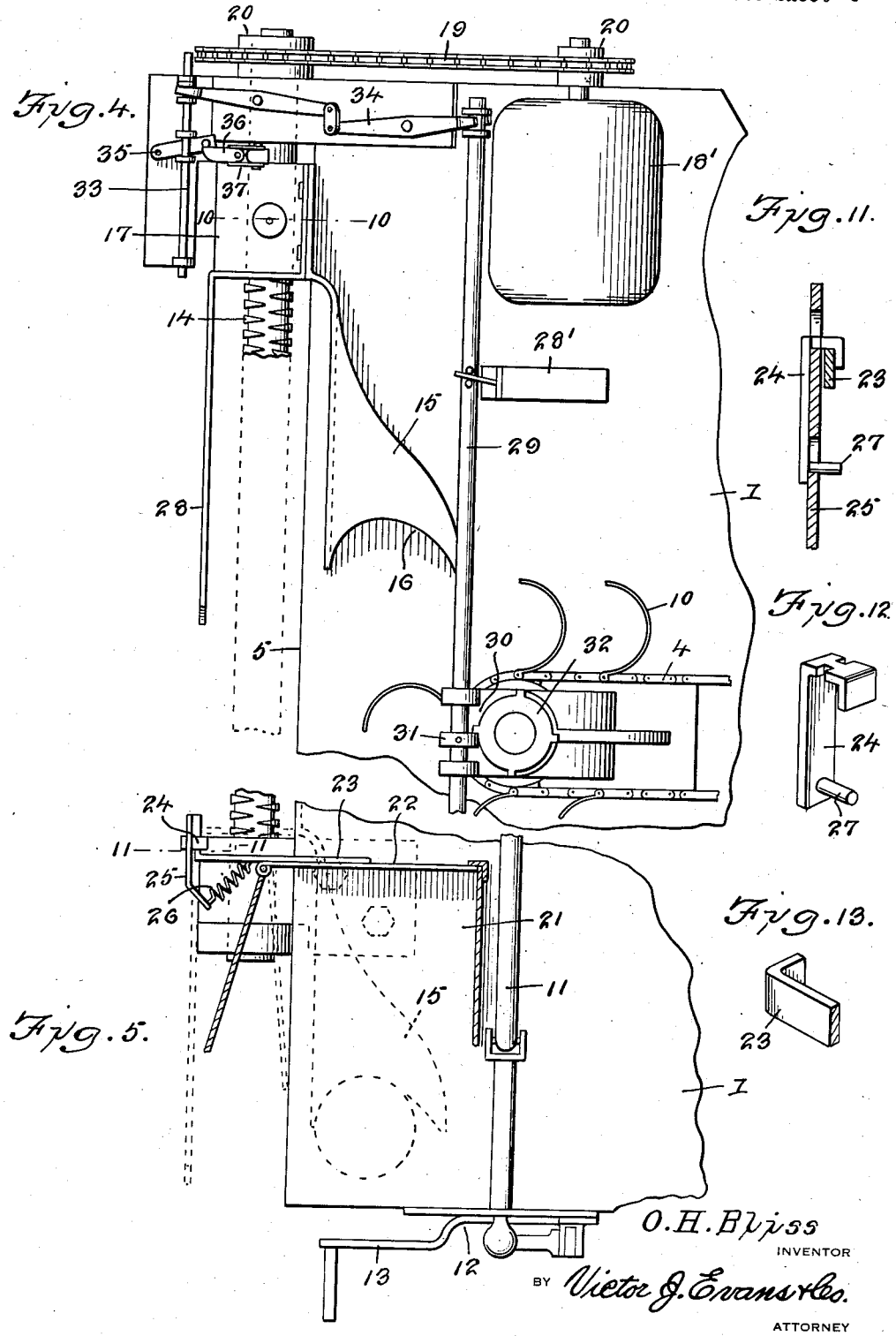

April 2, 1935.  O. H. BLISS  1,996,668
VENDING MACHINE
Filed Oct. 24, 1933   6 Sheets-Sheet 5
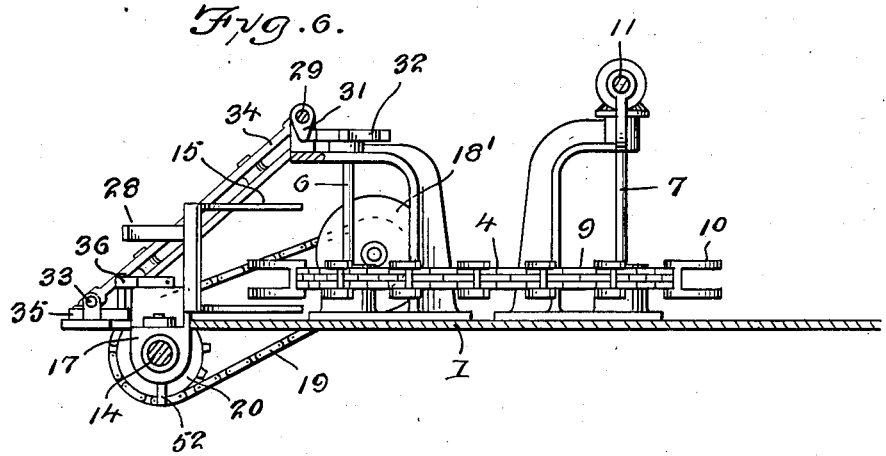
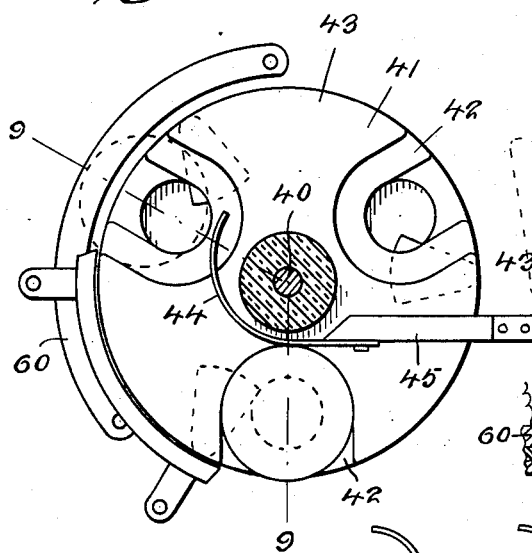
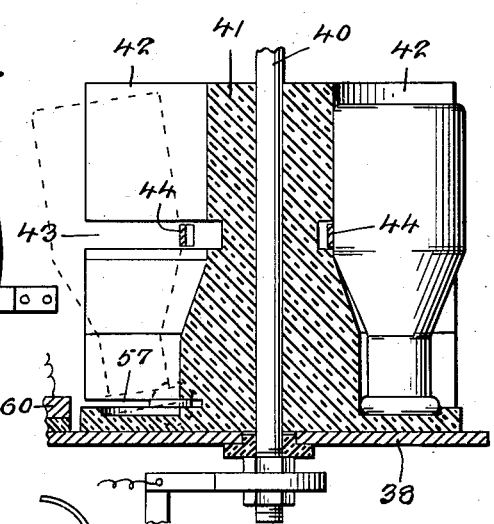
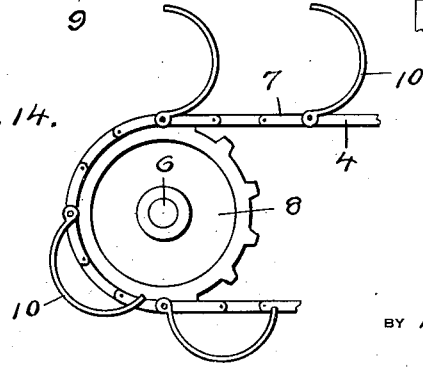

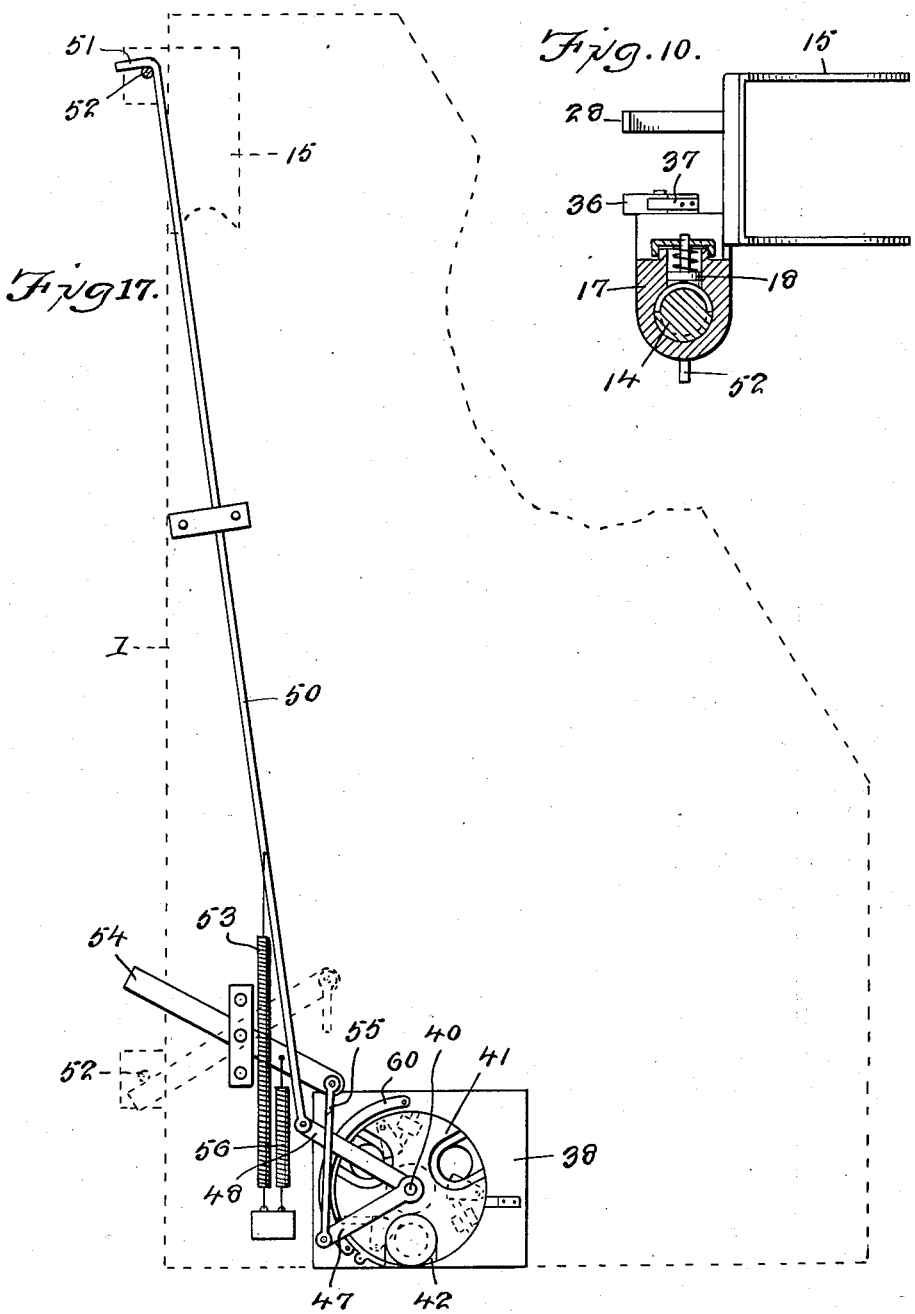

Patented Apr. 2, 1935

1,996,668

UNITED STATES PATENT OFFICE 1,996,668

VENDING MACHINE

Orval H. Bliss, Warren, Ohio

Application October 24, 1933, Serial No. 695,013

6 Claims. (Cl. 194—4)

This invention relates to vending machines for dispensing articles of merchandise such as dairy products wherein the products are sold in containers and has for the primary object, the provision of a device of the above stated character whereby a purchaser may readily obtain an article of merchandise on the payment of a coin and the return of a container to the machine and which operation may be successfully completed by the purchaser without the help or assistance of the seller, the device requiring the attention of the seller only when the supply of merchandise or products need replenishing.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a fragmentary horizontal sectional view illustrating a vending machine constructed in accordance with my invention.

Figure 3 is a fragmentary vertical sectional view illustrating the mechanism for ejecting the merchandise or products from the machine and also showing the means for receiving and depositing in the machine the empty bottle or container.

Figure 4 is a fragmentary horizontal sectional view drawn on an enlarged scale and showing the position of the ejector prior to ejecting an article of merchandise from the machine.

Figure 5 is a similar view to Figure 4 illustrating the ejector in dotted lines and occupying a position after completing the ejection of an article of merchandise from the machine.

Figure 6 is a sectional view taken on the line 6—6 of Figure 1.

Figure 7 is a sectional view taken on the line 7—7 of Figure 2.

Figure 9 is a sectional view taken on the line 9—9 of Figure 7.

Figure 10 is a detail sectional view taken on the line 10—10 of Figure 4.

Figure 11 is a detail sectional view taken on the line 11—11 of Figure 5.

Figure 12 is a perspective view illustrating a latch member.

Figure 13 is a fragmentary perspective view illustrating a keeper for the door of the machine.

Figure 14 is a fragmentary plan view illustrating one end of one of the conveyors.

Figure 16 is a diagrammatical view illustrating the wiring diagram of the machine.

Figure 17 is a plan view illustrating the mechanism for imparting a step by step movement to the empty container drum.

Figure 1:
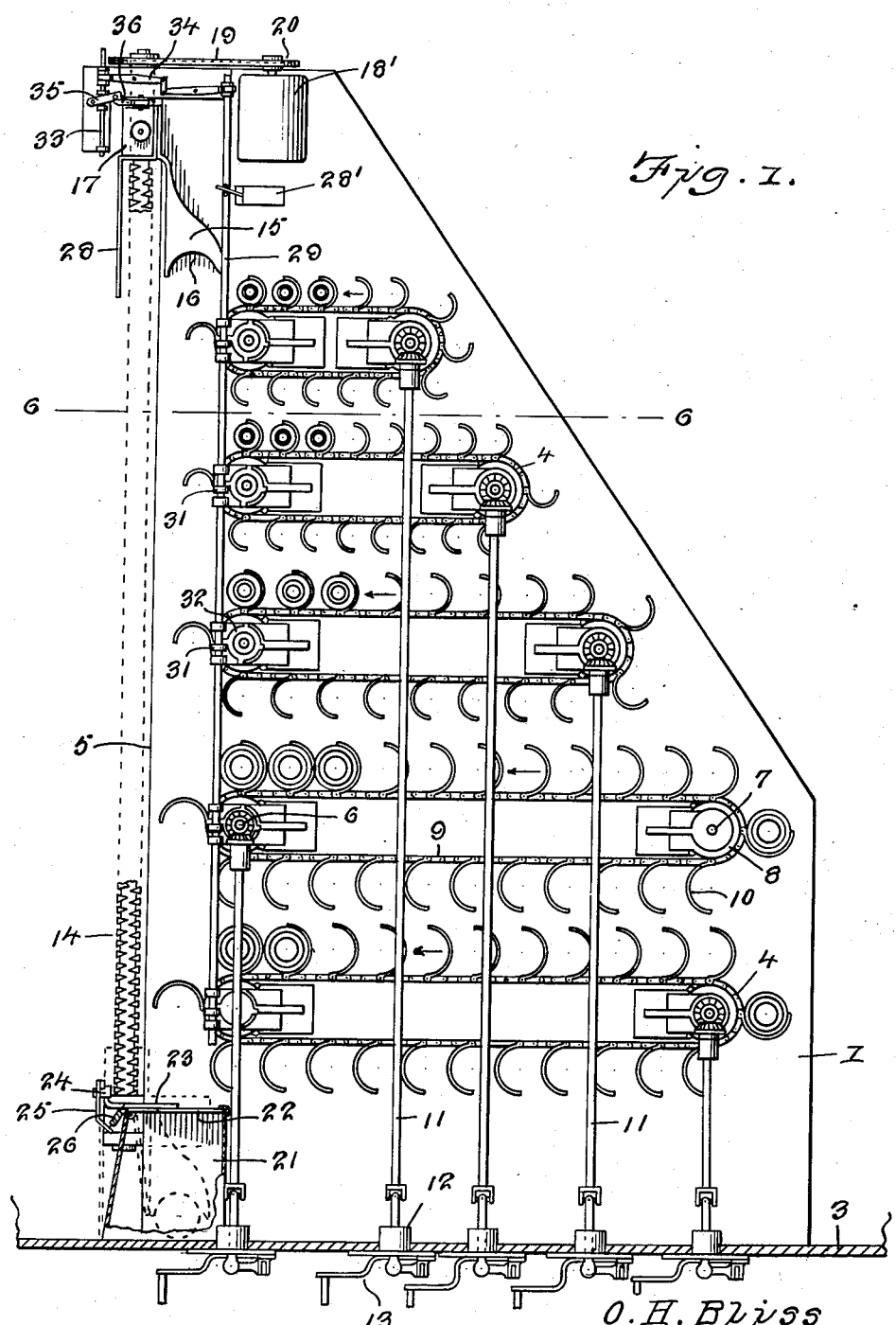
Figure 2:
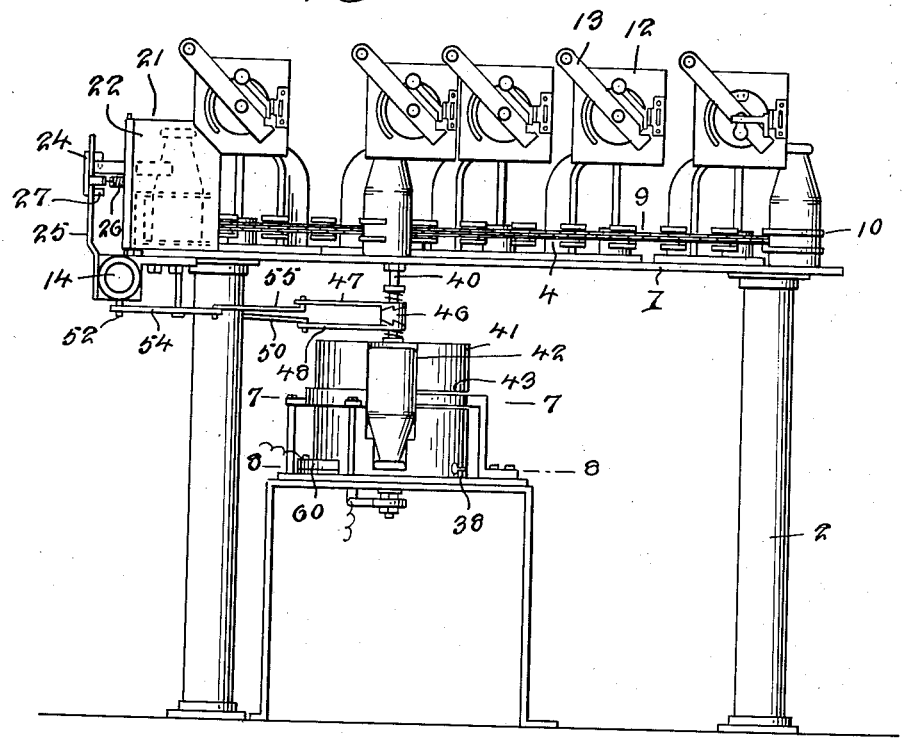
Figure 2 is a front elevation illustrating the device.
Figure 8:
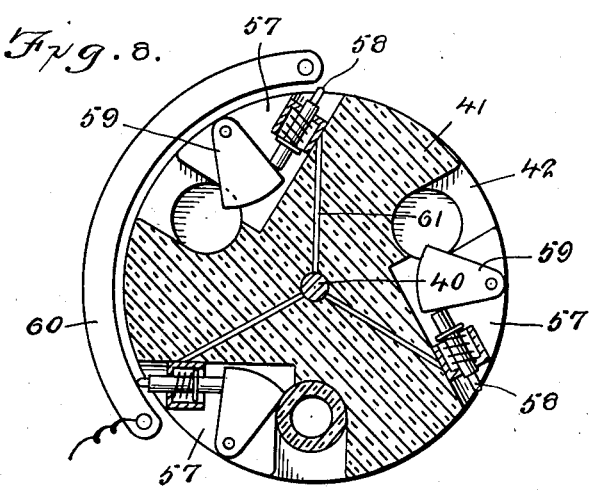
Figure 8 is a sectional view taken on the line 8—8 of Figure 2.
Figure 15:
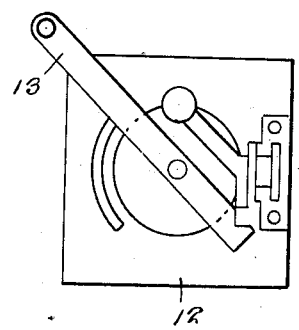
Figure 15 is a detail view illustrating broadly a coin control for the operating mechanism of the machine.

The machine disclosed in the official drawings is adapted for use in an enclosure of any desired character and consists of a horizontally arranged table 1 supported by legs 2 and having one edge disposed against the front wall 3 of the enclosure. A series of relatively spaced merchandise conveyors 4 are located over the table and are adapted when actuated to convey the articles of merchandise on the table towards the edge 5 thereof. Each conveyor consists of vertically arranged shafts 6 and 7 carrying sprocket gears 8 over which is trained a sprocket chain 9 having hinged thereto at spaced intervals arcuately curved flights 10. The containers having the merchandise therein are placed on the table in engagement with the flights so that as the conveyor receives a step by step movement, the containers will be brought adjacent the edge 5 of the table to be removed therefrom by an ejecting means which will be hereinafter more fully described.

Operating shafts 11 are suitably journaled on the table and each shaft is geared to a conveyor, as shown in Figure 1, and also connected to a coin controlled operating medium 12. The coin controlled mediums 12 are carried by the front wall of the enclosure and each equipped with an operating lever 13 locked against movement until a proper coin is deposited within the coin controlled medium and when freed by the coin will impart movement to the respective operating shaft sufficient to cause a movement of the respective conveyor for positioning a container adjacent the edge 5 of the table. The flights 10 of each conveyor are pivoted to the sprocket chain 9 in such a way that the free ends of said flights may swing towards the runs of the chain when engaged by the ejector means so that during the operation of the latter it may clear the ends of the conveyors or their flights disposed nearest to the edge 5 of the table.

A feed shaft 14 is arranged adjacent the edge 5 of the table and is suitably journaled to the latter and is of the double feed type, that is, the feed shaft 14 is capable of moving an ejector from one end thereof to its opposite end and automatically returning the ejector to its initial position on rotation of the feed shaft in one direction. An ejector 15 is disposed over the table 1 adjacent the edge 5 and at the discharge ends of the conveyors and is shaped to receive a container, as shown at 16. The ejector 15 is carried by a housing 17 slidable on the feed shaft. The housing 17 carries a feed nut 18 meshing with the threads of the feed shaft so that during the rotation of the feed shaft the ejector will be moved from the position shown in full lines in Figure 1 to the positions shown in dotted lines in said figure and then returned to its initial positon by the rotation of the feed shaft in one direction. The feed shaft is connected to an electric motor 18' by a sprocket chain 19 and sprocket gears 20 so that when an electric circuit is completed to the electric motor from an electric source for a predetermined length of time the feed shaft will be driven by the motor and cause the movement of the ejector as heretofore described.

A compartment 21 is mounted on the table 1 and is in communication with a discharge opening or exit in the wall 3 of the enclosure and the opposite end of the compartment is normally closed by a hinged door 22 so mounted that it may swing inwardly of the compartment but not outwardly therefrom and thereby provides a guard to prevent a person at the outside of the enclosure from reaching through the compartment to remove a container off of the table 1. A keeper or latch arm 23 is secured to the door 22 and projects beyond the hinged edge of said door to be engaged by a latch 24 slidably secured to a bracket 25. The bracket 25 is suitably supported and has connected thereto a coil spring 26 which is in turn connected to the keeper or latch arm 23 for normally urging the door 22 into closed position. A pin 27 is carried by the latch 24 and secured to the housing 17 of the ejector 15 is an arm 28 adapted to engage under the pin 27 and elevate the latch 24 as the ejector approaches the door 22 with a container so that said container may be deposited into the compartment 21 on the final movement of the ejector in one direction and as the ejector leaves the compartment to return to its initial position the door 22 immediately closes on the ejector leaving the compartment and the latch 24 again engages the keeper when the arm 28 moves from under the pin 27.

Mounted on the table adjacent the electric motor 18' is a switch 28' opened and closed by an operating shaft 29 and the switch is electrically connected to an electrical output or source and to the electric motor. Also arranged in the electric circuit with the switch is a circuit maker and breaker 30 and which will be hereinafter more fully described. The operating rod 29 is slidably mounted on the table and arranged at the discharge ends of the conveyors and has secured thereto spaced collars 31 to be engaged by star wheels 32 secured to the shafts 6 of the conveyors so that on operation of any one of the conveyors an endwise movement will be imparted to the shaft 29 for closing the switch 28'. An auxiliary shaft 33 is slidably mounted on the table and is connected to the operating shaft 29 by a series of pivotally mounted and pivotally connected levers 34. A pivoted arm 35 is operatively connected with the auxiliary shaft 33 to be swung in opposite directions by the endwise movements of said auxiliary shaft which in turn receives its motion in one direction by the switch operating rod 29 and its movement in an opposite direction by a pivoted dog 36 on the housing 17 of the ejector. The dog 36 is capable of pivoting in opposite directions and is held in its initial position by spring arms 37. The dog 36 when in its initial position lies in the path of movement of the pivoted arm 35. The auxiliary shaft when receiving its endwise movement from the switch operating shaft 29 moves the lever 35 past the dog 36 from the position shown in Figure 1, the spring arms 37 yielding to permit the passing of the arm 35 with respect to the dog. This operation positions the arm 35 to be engaged by the dog 36 when the ejector 16 completes an ejecting operation and returns to its initial position. The ejector returning to the initial position swings the lever 35 back to its original position by the dog 36 being held against pivotal movement by the spring arms 37 which have sufficient strength to cause an endwise shifting of the auxiliary shaft 33 and the switch operating shaft 29 to open the switch 28' and thereby break the circuit to the electric motor and stop the operation of the machine. As the conveyors are manually moved by a person operating the coin controlled mediums 12, a positive movement will be imparted to the switch operating shaft 29 to close the switch 28' and shift the auxiliary shaft 33 for positioning the arm 35 in place to be engaged by the dog 36 when the ejector returns after a complete ejecting operation to its initial position.

Located adjacent the exit in the enclosure is an entrance through which empty containers may be placed into the machine. A platform 38 is arranged adjacent the entrance and has associated therewith a chute 39 for receiving the containers from the platform and deposit them at a given point within the enclosure. A shaft 40 is journaled to the table 1 and to the platform 38 and has secured thereto a drum-like member 41 having formed in its periphery a series of container pockets 42 adapted to move into and out of alinement with the entrance during the rotation of the drum 41. The drum 41 receives a step by step movement which is sufficient to move a pocket into and out of alinement with the entrance and as a pocket moves away from the entrance it passes over the chute 39. The pockets are connected by a groove 43 in which a spring arm 44 operates. The spring arm is carried by a support 45 and the spring arm 44 is arcuately shaped so that when a pocket is opposite the entrance, the spring arm lies wholly within the groove 43 and when the pocket moves towards the chute 39 the free end portion of the spring arm exerts pressure on the container of the respective pocket and forces the container to fall or gravitate onto the chute 39. A ratchet element 46 is secured to the shaft 40 and its upper and lower faces are provided with ratchet teeth to be engaged by dogs 47 and 48 journaled on the shaft and capable of limited sliding movement on said shaft 40. The dogs are urged into engagement with the ratchet teeth of the ratchet element 46 by springs 49 and each dog has an integral arm and the arms occupy normal positions as shown in full lines in Figure 17. The arm of the dog 48 is pivoted to an operating rod 50 which has at its free end a hook 51 located at the end of the table 1 where the ejector occupies its normal position. A pin 52 is carried by the ejector and engages the hook 51 and said hook is urged in engagement with the pin by a spring 53 attached to the rod 50. The arm of the dog 47 is connected to one end of a pivotally mounted lever 54 by a link 55. The free end of the lever 54 lies in a path of movement of the pin 52 and is engaged by the latter when the ejector moves into the compartment 21. A spring 56 is connected to the lever 54 for returning the latter to its initial position when disengaged by the pin 52 of the ejector and which takes place during the return of the ejector to its initial position.

The drum is provided with recesses 57 in communication with the pockets and mounted in said recesses and normally projecting beyond the periphery of the drum are spring pressed contacts 58 in the form of plungers and located at the inner ends of the contacts are pivoted elements 59 normally entering the pockets so as to be engaged by a container when inserted in a pocket and cause an outward movement of the respective spring contact to engage an arcuate contact 60 located adjacent the drum. The contact 60 is electrically connected to the electric circuit and also the shaft 40 so that when any one of the movable contacts 58 engage the contact 60 by having a bottle or container in its respective pocket it will complete the electric circuit at the heretofore mentioned circuit maker and breaker 30. The movable contacts are electrically connected to the shaft 40 by conductors 61 embedded in the drum. The drum is constructed from a suitable insulating material. When a container is passed through the entrance of the enclosure into a pocket, the movable contact thereof is moved outwardly to engage the contact 60 and the person placing the container within said pocket then operates the desired coin controlled medium 12 by placing a proper coin therein and operating the hand lever thereof. The operation of the hand lever imparts movement to the proper conveyor, moving the latter so as to position a container in the path of movement of the ejector. During the movement of the conveyor the switch 28' is closed, completing the circuit to the motor 18' which in turn drives the feed shaft 14 causing the ejector to move the container into the compartment 21. After depositing the container in the compartment, the ejector returns to its initial position and automatically breaks the circuit to the motor 18' stopping the operation of the machine. During the operation of the machine or the movement of the ejector into and out of the compartment, the drum is given step by step movements by the dogs 47 and 48 placing the container deposited in the pocket over the chute so that the tension arm 44 may eject the container into said chute. During the operation of the machine to receive merchandise therefrom and to place a container into the machine by way of one of the pockets, another pocket moves in alinement with the entrance after the removal of the container to the chute.

A machine constructed in accordance with the foregoing may be easily and quickly manipulated or operated by a person desiring to obtain an article of merchandise and due to the number of conveyors and operating means therefor different kinds of merchandise may be dispensed from the machine or merchandise of the same character but in different quantities may be dispensed. Another important feature of this invention is the fact that it compels a purchaser to return to the machine an empty container each time a purchase is made for obtaining merchandise so as to prevent the seller from standing the cost of empty containers.

While I have shown and described the preferred embodiment of my invention, it will be understood that minor changes in construction, combination and arrangement of parts may be made without departing from the spirit and scope of my invention, as claimed.

Having described the invention, I claim:

1. A vending machine comprising a table to support merchandise containers, a compartment on the table from which a container may be manually removed, coin controlled and manually actuated means for positioning a container on the table for movement into said compartment, means under control of said first means to move the positioned container into the compartment and means to receive empty containers and controlling said second means to prevent actuation thereof until a container is placed in said third means.

2. A vending machine comprising a table, a compartment on the table from which merchandise containers may be manually removed, conveyors on the table for positioning merchandise containers to be moved to the compartment, means for operating any one of said conveyors, power driven means under the control of the conveyors to eject a container into the compartment, and means to receive empty containers and controlling said power actuating means to prevent actuation thereof until a container is placed in said third means.

3. A vending machine comprising a table to support merchandise containers, a compartment on the table from which a container may be manually removed, an endless conveyor on the table for positioning a container for movement into the compartment, manual means for actuating the conveyor, an ejector for transferring the positioned container to the compartment, power means for actuating the ejector and under the control of the movement of the conveyor, a door for the compartment to prevent unauthorized removal of a container from the table to the compartment, means on the ejector for automatically opening the door to permit said ejector to place a container in the compartment, a container receiver located adjacent the compartment to receive empty containers, and means for controlling the power means by the container receiving means.

4. A vending machine comprising a table to support merchandise containers, a compartment to receive a container from the table, a door for closing the compartment to the table, manually controlled means for positioning a container on the table for movement into the compartment, electrically actuated means under the control of said manual means for moving the positioned container into the compartment, means on said electrically actuated means to automatically open and close the door, a rotatably mounted drum having pockets to receive empty containers, electrical means for preventing operation of said electrical power means until a container has been positioned into a pocket.

5. A vending machine comprising a table to support merchandise containers, a compartment to receive a container from the table, a door for closing the compartment to the table, manually controlled means for positioning a container on the table for movement into the compartment, electrically actuated means under the control of said manual means for moving the positioned container into the compartment, means on said electrically actuated means to automatically open and close the door, a rotatably mounted drum having pockets to receive empty containers, electrical means for preventing the operation of said electrical power means until a container has been positioned into said pocket, and means operated by said electrical power means to effect a step by step movement to the drum for positioning the various pockets to receive empty containers.

6. A vending machine comprising a table to support merchandise containers, a compartment to receive a container from the table, a door for closing the compartment to the table, manually controlled means for positioning a container on the table for movement into the compartment, electrically actuated means under the control of said manual means for moving the positioned container into the compartment, means on said electrically actuated means to automatically open and close the door, a rotatably mounted drum having pockets to receive empty containers, electrical means for preventing operation of said electrical power means until a container has been positioned into a pocket, means operated by said electrical power means to effect a step by step movement to the drum for positioning the various pockets to receive empty containers, and means for ejecting an empty container from its respective pocket of the drum after one complete operation of the drum.

ORVAL H. BLISS.